UNITED STATES PATENT OFFICE 2,162,208

MINERAL OIL COMPOSITION

Robert C. Moran, Wenonah, William H. James, Paulsboro, and Everett W. Fuller, Woodbury, N. J., assignors to Socony-Vacuum Oil Company, Incorporated, New York, N. Y., a corporation of New York No Drawing. Application March 5, 1938, Serial No. 194,076

4 Claims. (Cl. 87—9)

This invention has to do in a general way with the production of mineral oil compositions and is more particularly related to the production of mineral oil compositions having characterizing properties which render them especially suitable for use as lubricants for turbines and as dielectrics for electrical equipment such as transformers.

As is well known to those familiar with the art, a mineral oil fraction which has been "moderately refined", as by treatment with a moderate amount of sulfuric acid or by a solvent-refining process, will, under the conditions of use encountered in turbines and electrical transformers, form substantial quantities of insoluble sludge. Such sludge formation clogs the pipes and vents in the oil circulation system of a turbine and the cooling ducts of a transformer. By forming films on the insulation it reduces the heat transfer in electrical transformers and in addition it substantially reduces the dielectric properties of the oil.

This tendency to form sludge may be reduced by treating the oils with very large amounts of sulfuric acid or of selective solvents, but such highly refined oils are expensive to prepare because of high treating losses and the large quantities of refining agents used. Furthermore, the very highly refined oils tend to form acidic products which attack metals with which they come in contact and also lower the dielectric properties of the oil.

The cost and other disadvantages of these highly refined oils have led to the investigation of means whereby oil fractions moderately refined to meet turbine and transformer specifications might be treated by the addition of an agent which would act as a negative catalyst to retard or inhibit the formation of sludge under these conditions of use. These investigations, which have been relatively extensive in scope, have led to the suggestion of a number of materials as inhibitors of sludge formation in moderately refined oils such, for example, as phenyl alpha naphthylamine and various organic salts of heavy metals. These materials, however, are not entirely satisfactory because of their low inhibiting effect, their cost, etc.

The present invention has as its primary object the production of a non-sludging moderately refined mineral oil for use in turbines and transformers and is predicated upon the discovery, after extensive investigation and experimentation, of a compound which possesses outstanding characteristics as an inhibitor or negative catalyst toward sludge formation in moderately refined mineral oil fractions that normally tend to form sludge under the conditions of use encountered in turbines and transformers.

It is a further object of this invention to provide a method of inhibiting sludge formation in moderately refined mineral oil fractions under the conditions of use encountered in turbines and transformers.

This invention, which is a continuation in part of the copending application of Robert C. Moran and William H. James, two of the inventors named herein, Serial Number 146,595, filed June 5, 1937, is based upon the discovery that aniline disulfide (diamino diphenyl disulfide), when admixed in minute quantities with moderately refined, normally sludging oils, produces outstanding reductions in the rate of sludge formation and renders such oils more suitable for use in turbines and transformers.

By the term "aniline disulfide" as used herein to identify the compounds or materials characterizing the improved non-sludging turbine oils and transformer oils contemplated by this invention, we have reference to the product obtained by reacting aniline with elementary sulfur at elevated temperature. (Hodgson, J. Chem. Soc. 125, 1855 (1924).)

For example, two moles of aniline and three atoms of sulfur are mixed together and heated to a temperature of about 170° to 195° C. In the reaction which takes place aniline disulfide (diamino diphenyl disulfide) is formed with evolution of hydrogen sulfide gas according to the following equation:

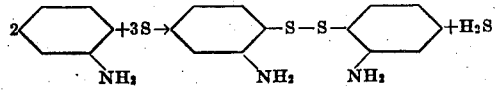

The first aniline disulfide product formed in the above reaction is 2,2' diamino diphenyl disulfide, but 4,4' diamino diphenyl disulfide is formed in increasing proportions as the temperature rises. There is also some formation of the 3,3' diamino diphenyl disulfide.

The unreacted aniline is removed from the reaction mixture by steam distillation. The product is freed from unreacted sulfur by converting the aniline disulfides to their hydrochlorides and extracting with hot water. The hydrochloride salt extract is then neutralized with a base such as sodium hydroxide to obtain an aniline disulfide product which has been satisfactorily used in the practice of this invention.

The product obtained by the above procedure melts at about 76°–85° C. According to the literature the isomer 2,2' diamino diphenyl disulfide melts at 93° C., the 3,3' isomer melts at 59–60° C. and the 4,4' isomer melts at 81 to 82° C. It will therefore be apparent to those familiar with the art that this product is a mixture of isomeric aniline disulfides. This mixture of isomers has proved satisfactory for the purposes of inhibiting smudge formation in normally sludging turbine oils and the like, and the term aniline disulfide as used herein is intended to include such an isomeric mixture as well as the individual isomers of which it is comprised.

The following examples illustrate the effectiveness of aniline disulfide as an inhibitor of sludge formation in mineral oils of the normally sludging type.

Example A

The oil used in this test had been moderately refined with sulfuric acid. It had an A. P. I. gravity of 28.2, a Saybolt viscosity of 57 seconds at 100° F. and a flash point of 280° F. The physical characteristics of the oil were of the type suited for transformer use. When a sample of this oil alone was heated for seven days at 120° C. in the presence of a piece of copper foil with oxygen gas bubbling therethrough at the rate of 2000 cc. per hour, a very heavy precipitate of sludge had formed in the oil. A similar sample of this same oil containing .05% by weight of aniline disulfide treated in the same way formed relatively little precipitate.

Example B

To demonstrate the value of aniline disulfide as a sludge inhibitor in oils of the type used in turbines several turbine-type oils were subjected to the following test procedure: A 25 cc. sample of oil was heated to 200° F. with five liters of air per hour bubbling therethrough. During this treatment twenty-four inches of eighteen gauge copper wire and one gram of iron granules were maintained in the sample and 2 cc. of distilled water were added each day. The tests were conducted with the samples of oil alone and with the samples of oil containing aniline disulfide and were conducted over varying periods of time. The sludge formed was measured at the end of these varying time intervals by centrifuging the oil, washing the precipitate thrown out with petroleum ether and weighing such precipitate.

In the tables given below we have set out briefly the specifications of the oil samples used at the head of each table and have tabulated the time in hours at the end of which the sludge precipitate was measured for the oil alone and the oil plus .10% of aniline disulfide. The amount of sludge formed, as set out in the tables below, is expressed in milligrams of sludge formed in 25 cc. of oil during the time interval set out in the first column.

Table I

*Oil used.*—A mineral oil fraction refined by the Duo-Sol method to give a product with A. P. I. gravity of 31.1, Saybolt viscosity of 158 seconds at 100° F. and flash point of 410° F.

|  | Time in hours | Sludge |
|---|---|---|
| Oil alone | 89 | 72 |
| Do | 209 | 295 |
| Oil+.10% aniline disulfide | 318 | 6 |
| Do | 647 | 25 |
| Do | 919 | 23 |

Table II

*Oil used.*—A mineral oil fraction refined with furfural to a twenty-five per cent loss: A. P. I. gravity of 31.8 and Saybolt viscosity of 136 seconds at 100° F.

|  | Time in hours | Sludge |
|---|---|---|
| Oil alone | 54 | 41 |
| Do | 144 | 66 |
| Oil+.10% aniline disulfide | 238 | 7 |
| Do | 903 | 63 |

Table III

*Oil used.*—A mineral oil fraction refined with furfural to an A. P. I. gravity of 27.5, Saybolt viscosity of 260 seconds at 100° F.

|  | Time in hours | Sludge |
|---|---|---|
| Oil alone | 148 | 24 |
| Do | 268 | 68 |
| Oil+.10% aniline disulfide | 263 | 24 |
| Do | 1,412 | 66 |

Table IV

*Oil used.*—A mineral oil fraction refined with Chlorex to an A. P. I. gravity of 33.1 and Saybolt viscosity of 135 seconds at 100° F.

|  | Time in hours | Sludge |
|---|---|---|
| Oil alone | 54 | 11 |
| Do | 120 | 103 |
| Do | 144 | 253 |
| Oil+.10% inhibitor | 238 | 12 |
| Do | 500 | 43 |
| Do | 572 | 59 |

From the foregoing tabulated results it will be apparent that through the use of aniline disulfide as a sludge inhibitor we are able to obtain from a moderately refined mineral oil fraction, potentially susceptible to the formation of sludge under the conditions of use normally encountered in a turbine, an oil composition which is substantially inhibited against such sludge formation. In addition to the foregoing laboratory tests turbine oils of the above type are being subjected to use with outstanding success in actual turbine operation, which further demonstrates the effectiveness of aniline disulfide as a sludge inhibitor.

We claim:

1. A mineral oil composition of the type adapted for use in turbines and transformers comprising a moderately refined mineral oil potentially susceptible to the formation of sludge under the conditions of use normally encountered in turbines and transformers and a minor proportion of aniline disulfide, sufficient to resist the formation of said sludge under said conditions of use.

2. A mineral oil composition comprising a mineral oil moderately refined to meet specifications for turbine use and potentially susceptible to the formation of sludge under the conditions of use encountered in a turbine and a minor proportion of aniline disulfide, sufficient to inhibit the formation of sludge under said conditions of use.

3. A mineral oil composition of the type adapted for use in turbines and transformers comprising a moderately refined mineral oil potentially susceptible to the formation of sluge under the conditions of use normally encountered in turbines and transformers and a minor proportion of a mixture of isomeric aniline disulfides, sufficient to resist the formation of said sludge under said conditions of use.

4. A lubricant composition comprising a mineral oil moderately refined to meet specifications for transformer use and potentially susceptible to the formation of sludge under the conditions of use encountered in a transformer and minor proportion of aniline disulfide, sufficient to inhibit the formation of sludge under said conditions of use.

ROBERT C. MORAN.
WILLIAM H. JAMES.
EVERETT W. FULLER.